United States Patent
Hellam et al.

(10) Patent No.: US 10,425,678 B1
(45) Date of Patent: Sep. 24, 2019

(54) CROWD-BASED AUDIO/VIDEO EXPERIENCES WITH MOBILE DEVICES

(71) Applicant: Disney Enterprises, Inc., Burbank, CA (US)

(72) Inventors: Taylor Hellam, Fresno, CA (US); Mohammad Poswal, Santa Clarita, CA (US); Malcolm E. Murdock, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/058,900

(22) Filed: Aug. 8, 2018

(51) Int. Cl.
| | |
|---|---|
| *H04N 5/932* | (2006.01) |
| *H04N 21/43* | (2011.01) |
| *H04N 21/432* | (2011.01) |
| *H04W 56/00* | (2009.01) |
| *H04N 21/258* | (2011.01) |
| *H04N 21/442* | (2011.01) |

(52) U.S. Cl.
CPC ... *H04N 21/4307* (2013.01); *H04N 21/25841* (2013.01); *H04N 21/4325* (2013.01); *H04N 21/4424* (2013.01); *H04W 56/0015* (2013.01)

(58) Field of Classification Search
CPC ........... H04N 21/4307; H04N 21/4325; H04N 21/0015; H04N 21/25841; H04N 21/4424
USPC ........ 386/201, 202, 203, 207, 208, 235, 324
See application file for complete search history.

(56) References Cited

U.S. PATENT DOCUMENTS

| | | | |
|---|---|---|---|
| 9,131,551 | B2 | 9/2015 | Hovey |
| 2002/0016736 | A1 | 2/2002 | Cannon |
| 2005/0166241 | A1 | 7/2005 | Kim |
| 2008/0181585 | A1 | 7/2008 | Bryant |
| 2009/0288120 | A1 | 11/2009 | Vasudevan |
| 2011/0103763 | A1 | 5/2011 | Tse |
| 2012/0120314 | A1* | 5/2012 | Yang .................... H04N 17/004 348/515 |
| 2014/0304597 | A1 | 10/2014 | Einstein |
| 2015/0237301 | A1* | 8/2015 | Shi ......................... H04N 7/147 348/14.08 |

(Continued)

OTHER PUBLICATIONS

Formerly Wham City Lights; Make Amazing Lightshows URL:http://offli.ne/#/app/home [retrieved on Dec. 20, 2016] 2 pgs.

(Continued)

*Primary Examiner* — Robert Chevalier
(74) *Attorney, Agent, or Firm* — Esplin & Associates, PC

(57) ABSTRACT

A system for providing group performance using a set of client devices. The time frame of reference of individual client devices of the set of client devices can be synchronized to the host time frame of reference. The individual client devices may effectuate the presentation of the content of the group performance predetermined points in time with respect to the host time frame of reference. Audio and/or visual content of the content provided by the individual client devices is based on the real-world location of the individual client devices. The content provided can be monitored to check if the content is presented at the predetermined points in time. The content provided is adjusted such that the content is provided at the more predetermined points in time. The presentation of the content in a synchronized manner results in the group performance.

20 Claims, 6 Drawing Sheets

(56) References Cited

U.S. PATENT DOCUMENTS

2016/0184726 A1 6/2016 Andersson
2019/0068664 A1* 2/2019 Kieft .................. H04L 65/4069

OTHER PUBLICATIONS

Gloto Syfy Sync URL:https://www.gloto.com/work/syfy-sync [retrieved on Dec. 20, 2016] 11 pgs.

* cited by examiner

CROWD-BASED AUDIO/VIDEO EXPERIENCES WITH MOBILE DEVICES

FIELD OF THE DISCLOSURE

The present disclosure relates to proving a group performance using a set of client devices.

BACKGROUND

Content can be performed by a group of devices. Coordinating the presentation of the content by the group of devices in a coherent manner may be difficult.

SUMMARY

One aspect of the present disclosure relates to providing a group performance using a set of client devices. The set of client devices may include a first client device, a second client device, and/or other client devices. The individual client devices of the set of client devices may be devices with the same hardware and/or operating systems and/or devices with the different hardware and/or operating systems. The group performance content may include audio and/or visual content. The group performance content provided by the first client device may be synchronized with the group performance content provided by other the client devices. The audio and/or visual content of the group performance content provided by the first client device may depend on the real-world location of the first client device. A client time frame of reference of the first client device may be synchronized with a host time frame of reference to facilitate production of the group performance content. The first client device may obtain information defining instructions for providing the group performance content at one or more points in time. The first client device may monitor the progress of the group performance content provided. The first client device may monitor the progress of the group performance content it should be providing. The first client device may determine a difference between the progress of the group performance content provided and the progress of the group performance content it should be providing. The first client device may adjust the progress of the group performance content provided to match the progress of the group performance it should be providing. The aggregate of the group performance content provided by individual client devices in a synchronized manner may result in the group performance.

In some implementations, a system configured to provide a group performance using a set of client devices may include one or more of one or more servers, one or more client devices, one or more external resources, and/or other components. Users may access the system via the client devices and/or other devices. The client devices may include a first client device, a second client device, and/or other client devices.

In some implementations, the server(s) may include one or more of electronic storages, one or more physical processors, and/or other components. In some implementations, the one or more physical processors may be configured by machine-readable instructions. Executing the machine-readable instructions may cause the one or more physical processors to facilitate providing the group performance using the set of client devices. The machine-readable instructions may include one or more computer program components. The one or more computer program components may include one or more of a content component, a synchronization component, a monitor component, a determination component, a presentation component, and/or other components.

The content component may be configured to obtain content information, time information, and/or other information. The content information may define group performance content and/or other information. The group performance content may include audio and/or visual content of the group performance and/or other information. The group performance content may include a start and end. The group performance content may include one or more points in between the start and end. The one or more points in between the start and end may indicate progress within the group performance content. In other words, the one or more points in between the start and end may indicate the point in time in the group performance content may be being provided. The content information may define audio and/or visual content of the first client device's portion of a group performance. The portion of the group performance provided by the individual client devices may be based on the location and/or area of the individual client devices may be in. The time information may indicate one or more points in time in the real world the first client device should provide the group performance content. In some implementations, the time information may indicate the one or more points in between the start and end of the group performance content should be provided in the one or more points in time in the real world. The one or more points in time being specified with respect to a host time frame of reference of a host device. The host device may be the second client device, the server, and/or other devices.

The synchronization component may be configured to synchronize a client time frame of reference of the individual client devices. The synchronization component may provide the individual client devices with information to synchronize the client time frame of reference. The synchronization component may be configured to synchronize the client time frame of reference by synchronizing the first client time frame of reference of the first client device with the host time frame of reference of the host device. The synchronized time frames may facilitate the provision of synchronized audio and/or visual content of the group performance content by the individual client devices including the first client device. The provision of the synchronized group performance content includes providing the one or more points in between the start and end of the group performance content at the one or more points in time in the real-world indicated by the time information with respect to the host time frame of reference. In some implementations, the individual client devices may synchronize the individual client time frames of reference based on the time information. The individual client devices may synchronize the individual client time frames of reference based on the time information independently of the synchronization component.

The monitor component may be configured to monitor client progress of the individual client devices in providing the group performance content. The client progress of the individual client devices may indicate a point between the start and end of the group performance content the individual client devices may be providing. In other words, the client progress of the individual client devices may indicate the points in time in the group performance content the individual client devices may be provided by the individual client devices. The client progress of the group performance content may indicate how much of the group performance content was presented and/or how much of the group performance content remains to be presented by the first client device. The monitor component may provide instructions for the individual client devices to monitor the client progress of the individual client devices. In some implementations, the individual client devices may monitor the client progress independently of the monitor component.

The determination component may be configured to determine a synchronized local offset time and/or other information. The determination component may cause the individual client devices to determine the synchronized local offset time. The synchronized local offset time may be determined based on the client progress, the time information, and/or other information. The synchronized local offset time may indicate a difference between the actual one or more points in time the first client device may be providing the group performance content and the one or more points in time the first client device should be providing the synchronized audio and/or visual content. The synchronized local offset time may indicate a difference between the one or more points in between the start and end the group performance content should be provided as indicated by the time information and the or more points in between the start and end the group performance content may be actually provided. The determination component may be configured to determine a time adjustment to the provision of the group performance content based on the synchronized local offset time. The determination component may cause the individual client devices to determine the time adjustment. The time adjustment may adjust the provision of the group performance content such that the actual one or more points in time the first client device may be providing the synchronized group performance matches the one or more points in time the first client device should be providing the group performance content as indicated by the time information. The individual client devices may determine the synchronized local offset time and/or the time adjustment independently of the determination component.

The presentation component may be configured to cause the first client device to provide the group performance content while accounting for the time adjustment. The presentation component may provide the first client device with information defining instructions to adjust the provision of the group performance content while accounting for the time adjustment such that the provision of the group performance content provided may be synchronized.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description and are not intended as a definition of the limits of the invention. As used in the specification and in the claims, the singular form of "a," "an," and "the" include plural referents unless the context clearly dictates otherwise.

DETAILED DESCRIPTION

Figure 1:
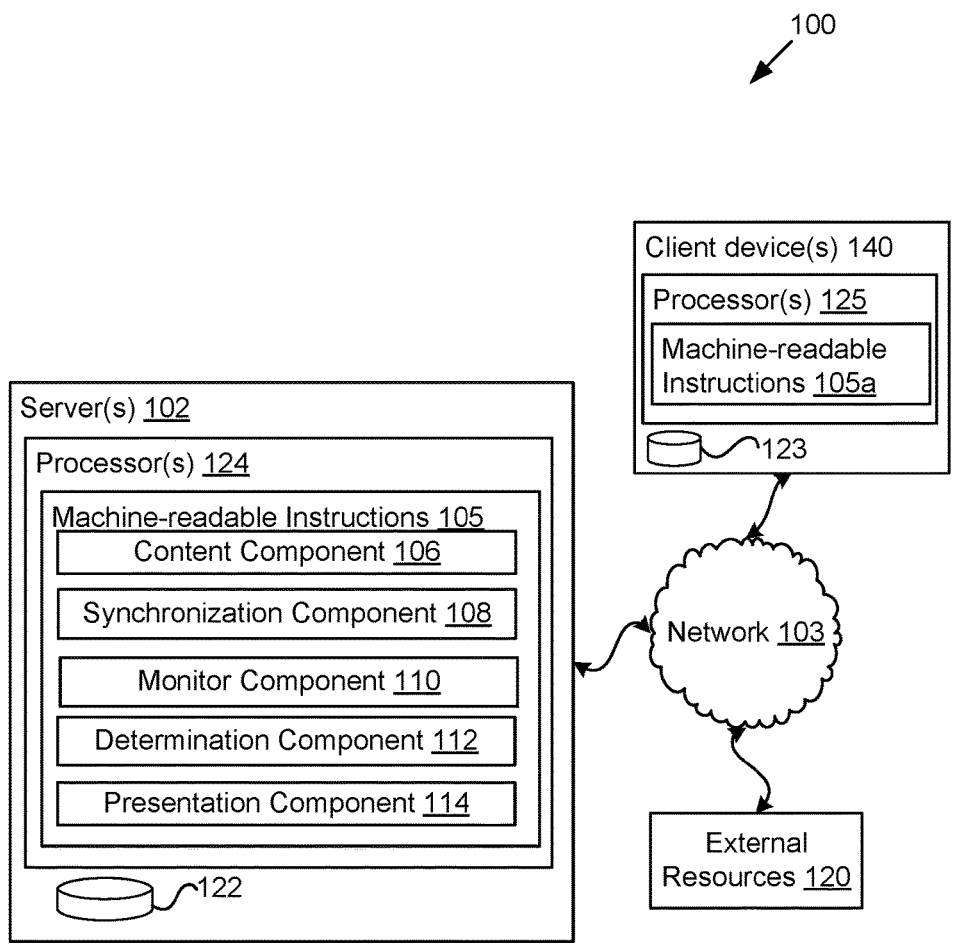
FIG. 1 illustrates a system for providing a group performance using a set of client devices, in accordance with one or more implementations.

FIG. 1 illustrates a system 100 for providing a group performance using a set of one or more client devices 140, in accordance with one or more implementations. The group performance may comprise of different portions of group performance content that make up the group performance. Client devices of the set of one or more client devices 140 in different locations and/or areas in the real-world may be configured to provide the different portions of group performance content to make up the group performance. A first client time frame of references of a first client device of the set of one or more client devices 140 may be synchronized with a host time frame of reference of a host device. The host device may be one or more servers 102, other client devices of the set of one or more client devices 140, and/or other devices. The first client time frame of references of the first client device may be synchronized with the host time frame of reference such that the provision of a first portion of the group performance content by the first client device at a first location and/or first area may be synchronized with the provision of other portions of group performance content by the other client devices of the set of one or more client devices 140 at other locations and/or areas.

In some situations, the first portion of the group performance content provided by the first client device may desynchronize over time. The desynchronization may be caused by a difference in hardware and/or operating systems between the first client device and the other client devices. The first client device may adjust the first portion of the group performance content provided during the provision of the first portion of the group performance content to minimize and/or eliminate asynchronous presentation of the group performance content by the first client device and the other client devices. The aggregate of the group performance content provided by the first client device and the other client devices may create the group performance.

In some implementations, system 100 configured to facilitate providing the group performance may include one or more of server(s) 102, client device(s) 140, one or more external resources 120, and/or other components. Users may access system 100 via individual client devices of client device(s) 140 and/or other devices.

In some implementations, server(s) 102 may include one or more of electronic storages 122, one or more physical processors 124, and/or other components. In some implementations, one or more physical processors 124 may be configured by machine-readable instructions 105. Executing machine-readable instructions 105 may cause one or more physical processors 124 to facilitate providing the group performance. Machine-readable instructions 105 may include one or more computer program components. The one or more computer program components may include one or more of a content component 106, a synchronization component 108, a monitor component 110, a determination component 112, a presentation component 114, and/or other components.

In some implementations, client device(s) 140 include one or more of electronic storages 123, one or more physical processors 125, and/or other components that may be the same and/or similar to electronic storages 122, physical processor(s) 124, and/or other components of server(s) 102. Client device(s) 140 may execute machine-readable instructions 105a that may be the same and/or similar to machine-readable instructions 105 to cause physical processors 125 to provide the group performance. Machine-readable instructions 105a may include one or more computer program components similar and/or the same as the one or more computer program components of machine-readable instructions 105.

Client devices 140 may be one or more of a mobile computing device, a personal computer, and/or other computing platforms. By way of non-limiting example, the mobile computing device may be one or more of a smartphone, smartwatch, and/or other devices. Client devices 140 may include one or more peripherals, the one or more sensors, one or more displays, and/or other components. The individual client devices of client devices 140 may include the first client device, a second client device, and/or other client devices. The first client device may be associated with a first user, the second client device may be associated with a second user, and/or the other client devices may be associated with other users. The individual client devices may be configured to provide the group performance content. The group performance content provided by the individual client devices may be different based on location in the real world of the individual client devices. It is noted that client devices 140 may represent an individual computing platform and/or more than one computing platform that may be similarly configured as described herein.

The displays may be a device configured to effectuate presentation of the virtual content and/or other content. The displays include one or more of a touch-enabled display (e.g., the touchscreen), an LCD display, a LED display, an OLED display, a projector, and/or other displays. In some implementations, the display may be a video projector and/or other devices.

The one or more peripherals may include one or more of an audio output device (e.g., speaker), an audio input device (e.g., a microphone), an input device, and/or other devices. In some implementations, one or more peripherals may be incorporated into client devices 140. In some implementations, the one or more peripherals may be removably coupled to client devices 140 and/or other devices. In some implementations, the one or more peripherals may be integrated in client devices 140 and/or other devices. The input devices may include one or more of a joystick, a sensor, a touch-enabled input device, a keypad, a controller, and/or other input devices.

The first client device may be configured to provide the group performance content and/or other content. The first client device may be configured to provide a portion of the group performance content and/or other content. The portion of the group performance content provided by the first client device may be referred to as the group performance content provided by the first client device here on out. The first client device may be configured to effectuate presentation of the group performance content and/or other content. The first client device may be configured to effectuate presentation of the group performance content via the one or more displays, one or more peripherals, and/or other components. For example, the first client device may be configured to effectuate presentation of the group performance content via the one or more displays, the audio output device, and/or other components.

The touch-enabled input device may be a touch screen and/or other devices. The touch screen may include one or more of a resistive touchscreen, a capacitive touchscreen, a surface acoustic wave touchscreen, an infrared touchscreen, an optical imaging touchscreen, an acoustic pulse recognition touchscreen, and/or other touchscreens. The touch-enabled input device may be configured to generate output signals conveying touch gesture information defining touch gesture inputs of the user.

The input devices 140 may be configured to obtain user input and/or other information. The user input may specify instructions for system 100. The user input may specify instructions for the individual client devices and/or other devices. The user input may include one or more of a body gesture input, touch gesture input, controller input, text input, audio input, movement input, and/or other inputs.

The body gesture input may include information defining movement of a body part of the user, including movement of a hand, arm, leg, lip, and/or other body parts of the user. In some implementations, the body gesture input may be obtained for visuals of the user. In some implementations, the body gesture input may convey sign language and/or other instructions. The sign language may specify instructions.

The touch gesture input may include information defining one or more movements. The movements may include one or more of a finger press, a finger tap, a finger swipe, a finger flick, a finger drag, a pinch, a touch-and-hold, a scroll, and/or other finger movements. These movements may similarly be carried out using a tool, such as a stylus.

The controller input may include information defining one or more of a key/button pressing input, a key/button tapping input, a swiping input, a flick input, a drag input, a key/button press-and-hold input, a scroll input, and/or other inputs from a controller. The controller input may include one or more of a movement of a mouse, a movement of a mouse while holding a button on the mouse, a press of one or more keys of a keyboard, a movement of a joystick, a movement of a joystick while holding of a button on a controller, and/or other controller inputs.

In some implementations, the text input may be obtained from a keyboard, an audio input device, and/or other devices. The text input may include one or more words in one or more languages. In some implementations, text input may be obtained from one or more voice recognition systems, natural language processing systems, gesture recognition systems, and/or other systems. The voice recognition systems may obtain audio signals from a user conveying one or more words and/or phrases. The natural language processing systems may obtain audio signals from a user and determine one or more words and/or phrases being conveyed by the user. The gesture recognition systems may obtain visual of the user conveying one or more words and/or phrases and/or instructions. The gesture recognition systems may interpret sign language.

The audio input may include audio information defining audio signals of the user. The audio signal of the user may be captured by a microphone and/or other audio capture devices. The audio signals from the user may be a voice command. In some implementations, instructions may be associated with the voice commands. In some implementations, audio input may be obtained from the one or more voice recognition systems, natural language processing systems, and/or other systems.

The movement input may include information defining movements of individual client devices and/or other devices. The movements may include a shaking movement, a projection movement, a rotation movement, and/or other movements. The shaking movement may include the user shaking computing platform(s) 140 and/or other devices.

The one or more sensors of the individual client devices may include a position sensor and/or other sensors. The position sensor may be configured to generate output signals conveying location information. The location information may specify a real-world location of the position sensor. In some implementations, the position sensor may include one or more of a global positioning system (GPS) and/or other positioning systems. In some implementations, the location information may specify a distance of the position sensor from a real-world location.

The first client device may be configured to removably and operationally connect to one or more of one or more peripherals, server(s) 102 and/or other components. Connection may be wired and/or wireless. Operational connection may refer to a connection which may facilitate communication of information between the individual client devices and individual components.

The first client device may be configured to control one or more components of system 100. By way of non-limiting illustration, the first client device may be configured to control the one or more components of server(s) 102 and/or other components of system 100. The first client device may be configured to removably and/or operationally connect to individual components of system 100 to provide processing capabilities for individual components of system 100.

The first client device may be configured to provide processing capabilities for the one or more peripherals, server(s) 102, and/or other components. By way of non-limiting example, physical processor(s) 125 may be used to provide processing capabilities for physical processor(s) 124. In some implementations, physical processor(s) 125 may be used to provide processing capabilities for the one or more components of machine-readable instructions 105.

The first client device may be configured to obtain information from the one or more peripherals, server(s) 102, and/or other components. The first client device may be configured to provide information to the one or more peripherals, server(s) 102, and/or other components. The first client device may be configured to provide information to individual components in response to information received from the individual component. The first client device may be configured to provide restructured information to individual components based on the information received from the individual component. For example, the first client device may determine some information based on the information received from individual components, and provide the determined information to the individual components. In some implementations, the first client device may communicate with the one or more peripherals by receiving information from the one or more peripherals. For example, the first client device may receive user inputs from the one or more peripherals. The information received may be user input and/or other information.

Electronic storages 122 may be configured to store one or more of content information, time information, and/or other information. Electronic storages 122 may provide server(s) 102, the first client device, and/or the components with the content information, the time information, and/or other information. Electronic storages 122 may store information provided by server(s) 102, the individual client devices, and/or other devices.

The content information may define the content provided by client device(s) 140. The content information may define the group performance and/or other information. The group performance may include one or more sub-portions of the group performance that make up the group performance. By way of non-limiting example, the group performance may be a presentation of an image with more than one pixels. The individual pixels make up the sub-portions of the group performance. The presentation of the individual pixels in a synchronized manner may result in the group performance.

The content information may define the group performance content that makes up the group performance and/or other information. The group performance content may include the one or more sub-portions of the group performance that make up the group performance. The content information may define the audio content, visual content, and/or other content of the group performance content that make up the group performance and/or other information. The group performance content may include the first portion of the group performance content, a second portion of the group performance content, and/or other portions of the group performance content. The individual portions of the group performance content may be the individual sub-portions of the group performance. By way of non-limiting example, the first portion of the group performance content may be a first pixel and/or a first group of pixels, the second portion of the group performance content may be a second pixel and/or a second group of pixels.

The presentation of the different portions of the group performance content in a synchronized manner by individual client devices may result in the group performance. The aggregate of the first portion, the second portion, and/or the other portions presented in a synchronized manner may make up the group performance. By way of non-limiting example, the first portion of the group performance content may be provided by the first client device, the second portion of the group performance content may be provided by the second client device, and/or the other portion of the group performance content may be provided by the other client devices.

In some implementations, the group performance content may be audio content and/or other content. The audio content may include one or more of a soundtrack, sound clip, utterances from a person, sound effects, and/or other audio. The audio content may include one or more sound clips that may up the audio content. The aggregate of the one or more sound clips provided in a synchronized manner may make up the soundtrack and/or the group performance content.

For example, the group performance content may be music and/or other audio content. The music and/or other audio content may include one or more sound components and/or other components. For example, the one or more sound components may be different musical and/or audio instrument generating audio signals. The individual sound components may be the portion of the group performance content. The provision of the individual sound components in a synchronized manner by the individual client devices may result in the music and/or other audio content.

For example, individual portion of the group performance may include one or more of a melody, lyrics, bass, chords, and/or other components that make up parts of music. By way of non-limiting example, the first portion of the group performance content may be a melody, the second portion of the group performance content may be the lyrics, and the other portions of the group performance content may be the other components that make up parts of music.

In some implementations, the group performance content may be visual content and/or other content. The visual content may include one or more of a video, video clip, image, and/or other visual content. The video/video clip may include visuals and/or audio. The audio of the video/video clip may be associated with the audio content and/or may be the audio content. The visual content may comprise one or more individual pixels and/or groups of pixels. The aggregate of the one or more individual pixels and/or groups of pixels provided in a synchronized manner may make up the video, video clip, image, and/or other visual content. The individual pixels and/or groups of pixels may be provided by the individual client devices.

For example, the group performance content may be a picture and/or a video. The picture and/or video may include one or more visual components and/or other components. The visual component may be one or more pixels and/or groups of pixels. The individual visual components may be the portion of the group performance content. The provision of the individual visual components in a synchronized manner by the individual client devices may result in the picture and/or video. For example, the individual client devices may effectuate presentation of the individual pixels and/or groups of pixels in a synchronized manner to result in the picture and/or video.

By way of non-limiting example, the group performance content may be a combination of the visual content, audio content, and/or other content. For example, the group performance content may be a combination of the music and/or other audio content and the picture and/or the video. The group performance content may be made of the individual sound components and the individual pixels and/or groups of pixels presented in a synchronized manner.

The content information may specify real-world locations in which the individual portions of the group performance content should be presented. The individual portions of the group performance content may be presented by groups of client devices that may be in the real-world locations and/or areas in which the individual portions of the group performance content should be presented. The real-world locations may include a first location, a second location, and/or other locations. In some implementations, the locations may be an area in the real world. The first portion of the group performance content may be provided by client devices in the first location. The second portion of the group performance content may be provided by client devices in the second location. The other portions of the group performance content may be provided by client devices in the other locations.

For example, if the first client device is at the first location, the first portion of the group performance content may be provided by the first client device. If the second client device is at the second location, the second portion of the group performance content may be provided by the second client device. The other client devices at the other locations may provide the other portions of the group performance content. The portion of the group performance content may be provided individual client devices may depend on their real-world location.

In some implementations, the content information may specify different groups of client devices of the set of client devices 140 that should provide the different portions of the group performance content. The different groups of client devices providing the different portions of the group performance content may be based on the location of the individual client devices. Client devices within the first location may be in a first group, the second location may be in a second group, and/or the other locations in other groups. The individual groups may provide the individual portions of the group performance content. The group the client devices belong to may change based on the real-world location of the client devices.

In some implementations, the content information may specify a range of distances from the host device in which the individual portions of the group performance content should be presented. For example, the host device may be a reference point for the individual client devices. The individual portions of the group performance content should be presented at a given range of distances from the host device. The individual portions of the group performance content may be presented at individual ranges. By way of non-limiting example, the first portion of the group performance content may be presented at a first range from the host device, the second portion of the group performance content may be presented at a second range from the host device, and/or the other portion of the group performance content may be presented at other ranges from the host device.

The group performance content may include a start and end. The performance content may include a progress length defining the start and end. The group performance content may include one or more points in between the start and end. The one or more points in between the start and end may indicate progress within the group performance content. In other words, the one or more points in between the start and end may indicate The audio content may have an audio progress length. The audio progress length may be defined in terms of time durations. For example, the soundtrack of the audio content may include a soundtrack having a time duration of 60 seconds. Other audio progress lengths and time durations are contemplated. The audio progress length may include a starting point in time defining the start of the audio content and an ending point in time defining the end of the audio content.

The visual content may have a visual progress length. The visual progress length may be defined in terms of time durations and/or frame numbers. For example, video and/or video clips of the visual content may include a video having a time duration of 60 seconds. The visual content may include a video having 1800 video frames. The visual content having 1800 video frames may have a play time duration of 60 seconds is viewed at 30 frames/second. Other visual progress lengths, time durations, and frame numbers are contemplated. The visual progress length may include a starting point in time defining the start of the visual content and an ending point in time defining the end of the visual content.

The time information indicating one or more points in time for the first client device should provide the group performance content (such as the first portion of the group performance content). In some implementations, the time information may indicate the one or more points in between the start and end of the group performance content should be provided in the one or more points in time in the real world. The one or more points in time being specified with respect to the host time frame of reference of the host device. One or more values may define the one or more points in time in the real world.

In some implementations, the time information may specify the points in time the group performance content should begin and end. The time information may specify the point in time the individual client devices should begin providing the group performance content and/or the point in time the individual client devices should finish providing the group performance content.

For example, the time information may define a first value that may specify a first point in time the first client device should begin providing it's portion of the group performance content. The time information may define the first value that may specify the first point in time the first client device should begin providing it's portion of the group performance content such that it's portion of the group performance content may be synchronized with the other portions of the group performance content provided by the other client devices. The first client device and the other client devices may begin providing the group performance content at the same point in time and/or at different times. The time information may define other values that may specify other points in time the one or more points in between the start and end of the group performance content should be provided.

The point in time the first client device and the other client devices should provide the group performance content may be with respect to the host time frame of reference of the host device. A common time frame of reference between the first client device and the other client devices may enable the first client device and the other client devices to provide the group performance content in a synchronized manner. The time information may enable the first client device and the other client devices to begin providing the group performance content at the same time and/or in a synchronized manner. In some implementations, the time information may include information defining the host time frame of reference of the host device.

The one or more points in between the start and end of the group performance content the individual client devices should be provided at the one or more points in time in the real-world may indicate intended progress for the provision of the group performance content. The one or more points in between the start and end of the group performance content the individual client devices may be actually provided at the one or more points in time in the real-world may indicate the actual progress of the provision of the group performance content. The first client device may adjust the provision of the one or more points in between the start and end of the group performance content such that the actual progress matches the intended progress.

By way of non-limiting example, if the group performance content has a progress length of 10 minutes, should be provided at the time 12:00 PM. At 12:05 PM, the group performance content provided should be 5 minutes into the progress length of 10 minutes of the group performance content. At 12:08 PM, the group performance content provided should be 8 minutes into the progress length of 10 minutes of the group performance content. If the group performance content provided at 12:08 PM is at 7 minutes into the progress length of 10 minutes of the group performance content, the group performance content provided may be adjusted such that the group performance content provided may be 8 minutes into the progress length of 10 minutes of the group performance content. The individual client devices providing the group performance content at the one or more points in time indicated by the time information may cause the group performance content provided to be synchronized.

Content component 106 may be configured to obtain the content information, the time information, and/or other information. Content component 106 may be configured to obtain the content information, the time information, and/or other information from electronic storages 122, external resources 120, and/or other devices and/or components.

Content component 106 may be configured to provide client device(s) 140 with the content information, the time information, and/or other information. The content information, the time information, and/or other information provided to client device(s) 140 may include instructions for providing the group content information. Client device(s) 140 may store the content information, the time information, and/or other information in electronic storages 123. Client device(s) 140 may use the stored the content information, the time information, and/or other information to effectuate presentation of the group performance content. For example, content component 106 may transmit the content information, the time information, and/or other information to the first client device. Content component 106 may be configured to provide the first client device with the content information, the time information, and/or other information such that first client device may provide of the group performance content. The first client device may provide of the group performance content my effectuating presentation of the group performance content.

Content component 106 may be configured to obtain the real-world location of individual client devices including the first client device. The real-world location of first client device may be conveyed by the output signal of the position sensors of the first client device. Content component 106 may be configured to determine the real-world location of the first client device based on the output signal of the position sensors of the first client device.

In some implementations, content component 106 may be configured to determine the real-world location of the first client device based on a signal strength between the first client device at the host device. In some implementations, content component 106 may be configured to determine the real-world location of first client device by triangulating the position of the first client device based on one or more real-world references locations. A real-world references location may be a real-world location of the host device.

Content component 106 may be configured to provide the content information, the time information, and/or other information to the individual client devices at the real-world locations the group performance content should be provided. For example, content component 106 may be configured to provide the content information, the time information, and/or other information at the point in time the first client device may be at the real-world locations the group performance content should be provided. Content component 106 may be configured to determine if the first client device may be at the real-world locations, and provide the content information, the time information, and/or other information to the first client device at the real-world locations. In some implementations, content component 106 may be configured to provide the content information, the time information, and/or other information to the individual client devices within a range of the host device in which the group performance content should be provided.

Content component 106 may be configured to provide the content information, the time information, and/or other information to the first client device such that the first client device may provide the group performance content at one or more points in time specified at the time information. Aforementioned, the group performance content provided by the individual client devices may be based on the real-world location of the individual client devices and/or the distance between the individual client devices and the host device.

In some implementations, content component 106 may determine the real-world location of the first client device and cause the first client device to provide the group performance content associated with the real-world location. For example, assuming the first client device may be at the first location during the provision of the group performance content, the first client device may provide the first portion of the group performance content. If the first client device may be at the second location during the provision of the group performance content, the first client device may provide the second portion of the group performance content. In some implementations, the first client device may determine it's real-world location and provide the portion of the group performance content associated with the real-world location.

Synchronization component 108 may be configured to synchronize client time frame of references of the individual client devices. Synchronization component 108 may be configured to synchronize the client time frame of references of the individual client devices such that the individual client time frame of references of the individual client devices may be the same. The synchronized client time frame of references of the individual client devices may enable the individual client devices to provide the group performance content in a synchronized manner. For example, the individual client devices may be enabled to begin providing the group performance content at the same time and at the same pace.

In some situations, different client devices may have different time frame of references. The different time frame of reference may be caused by a difference in the hardware of the different client devices. The different time frame of reference may be caused by inaccuracies between clocks of the client devices. The different time frame of reference may cause the different client devices to indicate different times as a given point in time. For example, at a real-world time of exactly 12:00 PM, the first client device with the first client time frame of references may indicate the time being 12:01 PM and the second client device with the second client time frame of references may indicate the time being 11:59 AM. If the client time frame of references of the first client device and the second client device are not synchronized prior to providing the group performance content at a given point in time (e.g., 12:00 PM), the group performance content provided by the two client devices will not be synchronized.

Synchronization component 108 may be configured to synchronize the client time frame of references of the individual client devices based on the time information and/or other information. Synchronization component 108 may be configured to synchronize the client time frame of references of the individual client devices by setting the client time frame of references of the individual client devices to match the host time frame of reference of the host device. Setting the client time frame of references of the individual client devices to match the host time frame of reference of the host device may enable the first client time frame of reference of the first client device with the other client time frame of reference of the other client devices to have a common time frame of reference.

Synchronization component 108 may be configured to provide the individual client devices with information defining the host time frame of reference such that the individual client devices may synchronize the individual client time frame of reference with the host time frame of reference. Synchronization component 108 provides the individual client devices with information with instructions for the individual client devices to synchronize the individual client time frame of reference with the host time frame of reference.

In some implementations, the host device may be server(s) 102, a client device of the set of client devices 140 (for example, the second client device), and/or other devices. The host device may be configured to provide the individual client devices with information defining the host time frame of reference such that the individual client devices may synchronize the individual client time frame of reference with the host time frame of reference. The host device may be configured to provide the individual client devices the time information defining the host time frame of reference. For example, the individual client devices may synchronize the individual client time frame of reference with the host time frame of reference by setting the individual client time frame of reference to match the host time frame of reference. The individual client devices may be required to synchronize the individual client time frame of reference to the host time frame of reference prior to providing the group performance content.

By way of non-limiting example, synchronization component 108 may be configured to synchronize the first client time frame of reference of the first client device with the host device which may be the second client device. Synchronization component 108 may set the first client time frame of reference of the first client device to match a second client time frame of reference of the second client device. In some implementations, synchronization component 108 may be configured to transmit information defining the second client time frame of reference of the second client device to the first client device such that the first client device may set the first client time frame of reference to match the second client time frame of reference. The second client devices may determine the real-world time based on one or more clocks of the second client devices and/or the second client time frame of reference.

By way of non-limiting example, synchronization component 108 may be configured to synchronize the first client time frame of reference of the individual client devices with the host device which may be server(s) 102. Synchronization component 108 may set the first client time frame of reference of the first client device to match a server time frame of reference of the server(s) 102. In some implementations, synchronization component 108 may be configured to transmit information defining the server time frame of reference to the first client device such that the first client device may set the first client time frame of reference to match the server time frame of reference. Server(s) 102 may determine the real-world time based on one or more clocks of server(s) 102 and/or the server client time frame of reference.

By way of non-limiting example, synchronization component 108 may be configured to synchronize the first client time frame of reference of the first client device with the host device which may be another device. Synchronization component 108 may set the first client time frame of reference of the first client device to match a device time frame of reference of the other device. In some implementations, synchronization component 108 may be configured to transmit information defining the device time frame of reference to the first client device such that the first client device may set the first client time frame of reference to match the device time frame of reference. The other devices may determine the real-world time based on one or more clocks of the other devices and/or the device client time frame of reference.

The synchronized client time frame of reference of the first client device may enable the first client device to start providing the group performance content in a synchronized manner and/or provide the group performance content in a synchronized manner during the provision of the group performance content with the other client devices. The provision of the synchronized group performance content includes providing the one or more points in between the start and end of the group performance content at the one or more points in time in the real-world indicated by the time information with respect to the host time frame of reference.

The synchronized time frames may facilitate production of synchronized audio and/or visual content of the group performance content by the individual client devices. The synchronized time frames of the client time frame of reference of the individual client devices may enable the individual client devices to produce of the synchronized audio and/or visual content of the group performance content. The production of the synchronized group performance content including the production of the group performance synchronized with one or more points in time specified with respect to the host time frame of reference.

By way of non-limiting example, the first client time frame of reference of the first client device may or may not match the second client time frame of reference of the second client device. The provision of the group performance content by the first client device and the second client device based on their respective client time frames of reference may distort the intended group performance content if their respective client time frame of reference does not match. The first client device and the second client device may set their respective client time frame of references to match the host time frame of reference of the host device such that the respective client time frame of reference of the first client device and the second client device matches. The synchronized client time frame of references of the first client device and the second client device may enable the provision of the group performance content in a synchronized manner and generate the intended group performance content.

In some implementations, synchronization component 108 may determine a client-host offset time for the first client device. The client time frame of reference of the first client device may be synchronized with the host time frame of reference by determining the client-host offset time for the first client device. The client-host offset time for the first client device representing a relative time difference between the client time frame of reference and the host time frame of reference. The first client device adjusts presentation of the audio and/or visual content based on the client-host offset times such that the client time frame of reference of the first client device may be synchronized. For example, the client-host offset time may indicate how much the client time frame of reference of the first client device should be adjusted by to be synchronized with the host time frame of reference.

In some implementations, synchronization component 108 may be configured to provide the first client device with the host time frame of reference such that the first client device may determine the client-host offset time for the first client device. The first client device may adjust the client time frame of reference of the first client device based on the client-host offset time such that the client time frame of reference of the first client device may be synchronized with the host time frame of reference.

Monitor component 110 may be configured to monitor the client progress of the individual client devices in providing the group performance content. The individual client devices may provide the group performance content after the client time frame of reference of the individual client devices may be synchronized. The client progress of the individual client devices may be with respect to the synchronized client time frame of reference of the individual client devices.

The client progress of the individual client devices may indicate a point between the start and end of the group performance content the individual client devices may be providing. In other words, the client progress of the individual client devices may indicate the points in time in the group performance content the individual client devices may be provided by the individual client devices. The client progress of the group performance content may indicate how much of the group performance content was presented and/or how much of the group performance content remains to be presented by the individual client devices. The client progress of the group performance content may be specified by an amount of time, a percentage of the group performance content was presented, a percentage of the group performance content remaining to be presented by the individual client devices.

Monitor component 110 may be configured to monitor a first client progress of the first client device in providing the group performance content. The first client progress may indicate an actual progress of the first client device may be providing the group performance content. The first client progress may indicate a point between the start and end of the group performance content the first client device may be provided at a given point in time. For example, if the group performance content is a 10-minute visual and/or audio content, the first client progress may indicate the point in time in the 10-minute visual and/or audio content the first client device is presenting providing and/or has provided at a given point in time.

The first client progress may be compared to the intended progress of the group performance content to determine if the first client device is providing the group performance content at a correct time and/or pace. The intended progress of the group performance content may indicate the one or more points in time the first client device should be providing the group performance content. The intended progress of the group performance content may indicate the one or more points in time the first client device should be provided the one or more points in between the start and end of the group performance content.

The intended progress of the group performance content may be defined by the time information. The first client progress may or may not match the intended progress of the group performance content. The first client progress may lag behind be ahead of the intended progress of the group performance content based on the processing and/or other hardware capabilities of the first client device. In some implementations, the first client progress may lag behind or be ahead of the intended progress of the group performance content the presentation of the group performance content may be paused for some duration of time, or the presentation of the group performance content may be presented before it should be, and/or other events. The asynchronization between the first client progress and the intended progress of the group performance content may cause an asynchronous in the presentation of the group performance content by the first client device and the other client devices.

In some implementations, monitor component 110 may be configured to obtain the first client progress from the first client device. The first client device may monitor the provision of the group performance content, determine the first client progress, and transmit information defining the first client progress to monitor component 110. In some implementations, the first client device may include a monitor component that may be the same and/or similar to monitor component 110 configured to monitor the first client progress of the first client device.

In some implementations, monitor component 110 may be configured to provide the intended progress of the group performance content to the first client device such that the first client device may determine the differences between the intended progress of the group performance content and the first client progress.

Monitor component 110 may be configured to monitor the first client progress of the first client device during the provision of the group performance content. Monitor component 110 may be configured to monitor the first client progress of the first client device in contemporaneously with the provision of the group performance content. The first client progress and the intended progress of the group performance content may be compared to determine if the group performance content provided by the first client device is synchronized.

Determination component 112 may be configured to determine a synchronized local offset time and/or other information. The synchronized local offset time may indicate a difference between the first client progress and the intended progress of the group performance content. The synchronized local offset time may indicate the difference between the first client progress and the intended progress of the group performance content with respect to the synchronized time frames of the client time frame of reference of the individual client devices.

The synchronized local offset time may be determined based on the client progress, time information, and/or other information. Determination component 112 may be configured to determine a synchronized local offset time by comparing the first client progress with the intended progress of the group performance content and determining a difference. The synchronized local offset time may indicate a difference between the first client progress with the intended progress of the group performance content.

The synchronized local offset time may indicate a difference between actual one or more points in time the first client device may be providing the group performance content and the one or more points in time the first client device may be supposed to provide the group performance content. For example, the synchronized local offset time may indicate a difference between the one or more points in between the start and end the group performance content should be provided as indicated by the time information and the or more points in between the start and end the group performance content may be actually provided. The difference may indicate that the group performance content provided by the first client device may not be synchronized with the group performance content provided by the other client devices.

Determination component 112 may be configured to determine a time adjustment to the provision of the group performance content by the first client device. The time adjustment may define a change to the group performance content provided by the first client device such that the actual progress of the group performance content provided matches the intended progress of the group performance content. The time adjustment may define a change to the group performance content provided by the first client device such that the one or more points in between the start and end the group performance content provided by the first client device at the one or more in point the group performance content should be provided. The first client device may use the time adjustment to the provision of the group performance content to adjust the group performance content provided to synchronize the group performance content provided with the other client devices.

Determination component 112 may be configured to determine the time adjustment to the provision of the group performance content based on the synchronized local offset time. Determination component 112 may be configured to determine the time adjustment such that the difference between the actual progress of the group performance content provided at the intended progress may be minimized and/or eliminated. The time adjustment may adjust the provision of the group performance content such that the actual one or more points in time the first client device may be providing the group performance content matches the one or more points in time the first client device should be providing the group performance content.

Determination component 112 may be configured to determine the time adjustment to the provision of the group performance content such that the first client progress matches the intended progress of the group performance content. By way of non-limiting example, the first client progress may be lagging behind the intended progress of the group performance content. Determination component 112 may determine a first time adjustment to adjust the actual progress of the group performance content such that the first client progress may be not lagging behind the intended progress of the group performance content or matches the intended progress of the group performance content. By way of non-limiting example, the first client progress may be ahead of the actual progress of the group performance content. Determination component 112 may determine a second time adjustment to the actual progress of the group performance content such that the first client progress may not ahead of the intended progress of the group performance content or matches the intended progress of the group performance content.

Determination component 112 may be configured to determine the synchronized local offset time and the time adjustment during the provision of the group performance content. The synchronized local offset time and the time adjustment may be determined during the provision of the group performance content such that any asynchronization of the group performance content provided can be adjusted in real-time or near real time as the group performance content may be provided.

In some implementations, determination component 112 may be configured to provide the first client device with the intended progress of the group performance content such that the first client device may set the first client progress to match the intended progress of the group performance content. The first client device may set the first client progress to match the intended progress of the group performance content in real time or near real time during the provision of the group performance content. The first client device may set the first client progress to match the intended progress of the group performance content such that group performance content provided may be synchronized with the group performance content provided with the other client devices.

Presentation component 114 may be configured to cause the first client device to provide the group performance content. Presentation component 114 may provide information defining instructions for the first client device to provide the group performance content. The instructions may include instructions for the first client device to begin providing the group performance content at a point in time indicated by the time information.

Presentation component 114 may be configured to cause the first client device to provide the group performance content while accounting for the time adjustment. Presentation component 114 may be configured to cause the first client device to provide the group performance content at the one or more points in time the presentation component 114 should provide the group performance content by accounting for the time adjustment.

Presentation component 114 may be configured to provide the first client device with the time adjustment such that the first client device may provide the group performance content while accounting for the time adjustment. Presentation component 114 may provide the first client device with information defining instructions to adjust the provision of the group performance content while accounting for the time adjustment such that the provision of the group performance content may be synchronized. The provision of the group performance content while accounting for the time adjustment by the first client device may cause the group performance content provided to be synchronized with the group performance content provided by the other client devices.

In some implementations, presentation component 114 may be configured to enable the first client device to provide the group performance content at the one or more points in time indicated by the time information. Presentation component 114 may be configured to enable the first client device to start providing the group performance content at the point in time the group performance content should start providing the group performance content defined by the time information.

In some implementations, presentation component 114 may be configured to obtain the criteria information. The criteria information may define criteria associated with the provision of the group performance content. The group performance content may be provided one or more criteria may be satisfied. The presentation component 114 may be configured to obtain parameter values of parameters of the first client device to determine whether the one or more criteria may be satisfied. Responsive to the satisfaction of the criteria based on the parameter values, presentation component 114 may enable the provision of the synchronized audio and/or visual content by the first client device. Responsive to non-satisfaction of the criteria based on the parameter values, presentation component 114 disable the provision of the synchronized audio and/or visual content by the first client device.

In some implementations, the criteria include one or more of having a particular operating system model, having a network connection with the host device, having available memory, having available processing power, enabling one or more speakers associated with the individual client devices, enabling one or more displays associated with the individual client devices, being in a geolocation, and/or being in proximity to a geolocation.

In some implementations, the one or more criteria may be one or more game criteria. For example, presentation component 114 may be configured to enable the first client device to provide the group performance content the first user interacts with a game presented on the first client device with the group performance content. In some implementations, the game requires the first user to provide a series of user inputs. For example, the game may involve playing a virtual instrument on the first client device. Presentation component 114 may require the first user to input a series of user inputs to play the virtual instrument on the first client device to enable the provision of the group performance content.

In some implementations, the one or more criteria may be device status criteria. For example, the one or more criteria may require the first user to have a functioning speaker system, a functioning display, and/or other systems on the first client device. In some implementations, the one or more criteria may require the first client device to have a predetermined about of processing capability, storage, and/or other computing system requirements.

In some implementations, server(s) 102, computing platform(s) 140, and/or external resource(s) 120 may be operatively linked via one or more electronic communication links. For example, such electronic communication links may be established, at least in part, via a network 103 such as the Internet and/or other networks. It will be appreciated that this is not intended to be limiting, and that the scope of this disclosure may include implementations in which server(s) 102, computing platform(s) 140, and/or external resource(s) 120 may be operatively linked via some other communication media.

In some implementations, external resource(s) 120 may include sources of information, hosts and/or providers of virtual environments outside of system 100, external entities participating with system 100, and/or other resources. In some implementations, some or all of the functionality attributed herein to external resource(s) 120 may be provided by resources included in system 100.

In some implementations, Server(s) 102 may include electronic storage(s) 122, processor(s) 124, and/or other components. Server(s) 102 may include communication lines or ports to enable the exchange of information with a network and/or other computing devices. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing devices operating together as server(s) 102.

In some implementations, electronic storage(s) 122 may include electronic storage media that electronically stores information. The electronic storage media of electronic storage(s) 122 may include one or both of system storage that is provided integrally (i.e., substantially nonremovable) with server(s) 102 and/or removable storage that is removably connectable to server(s) 102 via, for example, a port (e.g., a USB port, a firewire port, etc.) or a drive (e.g., a disk drive, etc.). Electronic storage(s) 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage(s) 122 may include one or more virtual storage resources (e.g., cloud storage, a virtual private network, and/or other virtual storage resources). Electronic storage(s) 122 may store software algorithms, information determined by processor(s) 124, information received from server(s) 102, information received from computing platform(s) 140, and/or other information that enables server(s) 102 to function as described herein.

In some implementations, processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same computing platform, or processor(s) 124 may represent processing functionality of a plurality of devices operating in coordination. The processor(s) 124 may be configured to execute computer-readable instruction components 106, 108, 110, 112, 114, and/or other components. The processor(s) 124 may be configured to execute components 106, 108, 110, 112, 114, and/or other components by software; hardware; firmware; some combination of software, hardware, and/or firmware; and/or other mechanisms for configuring processing capabilities on processor(s) 124.

It should be appreciated that although components 106, 108, 110, 112, and 114 are illustrated in FIG. 1 as being co-located within a single processing unit, in implementations in which processor(s) 124 may include multiple processing units, one or more of components 106, 108, 110, 112, and/or 114 may be located remotely from the other components. The description of the functionality provided by the different components 106, 108, 110, 112, and/or 114 described herein is for illustrative purposes, and is not intended to be limiting, as any of components 106, 108, 110, 112, and/or 114 may provide more or less functionality than is described. For example, one or more of components 106, 108, 110, 112, and/or 114 may be eliminated, and some or all of its functionality may be provided by other ones of components 106, 108, 110, 112, and/or 114. As another example, processor(s) 124 may be configured to execute one or more additional components that may perform some or all of the functionality attributed herein to one of components 106, 108, 110, 112, and/or 114.

Figure 3:
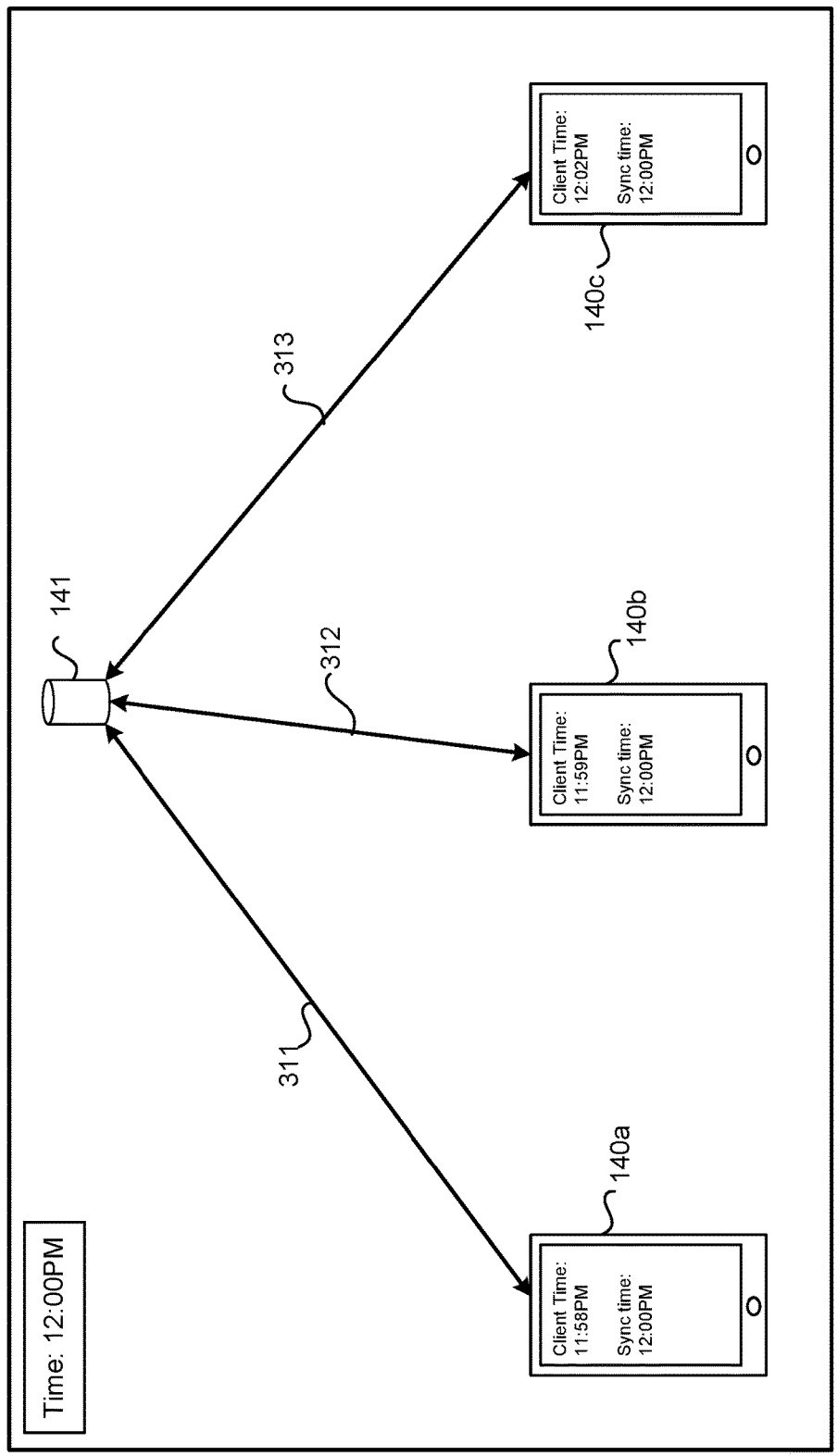
FIG. 3 illustrates a host device communicating information with individual client devices, in accordance with one or more implementations.

FIG. 3 illustrates a host device 141 communicating information with client device(s) 140. The host device 141 may be server(s) 102 and/or other devices. Client device(s) 140 include a first client device 140*a*, a second client device 140*b*, a third client device 140*c*, and/or other client devices. Host device 141 may provide first client device 140*a*, second client device 140*b*, third client device 140*c*, and/or other client devices with the content information, the time information, and/or other information such that the individual client devices may provide the group performance content. Host device 141 may transmit a first signal 311 to first client device 140*a*, a second signal 312 to second client device 140*b*, a third signal 313 to third client device 140*c*, and/or other signals to other client devices conveying the content information, the time information, and/or other information. The signals may include the content information, the time information, and/or other information. The individual client devices may synchronize their individual client time frame of reference with the host time frame of reference. The time information may indicate time with respect to the host time frame of reference for the individual client devices to provide the group performance content. By way of non-limiting example, the time information may indicate that 1:00 PM as the time for the individual client devices to provide the group performance content.

Figure 4:
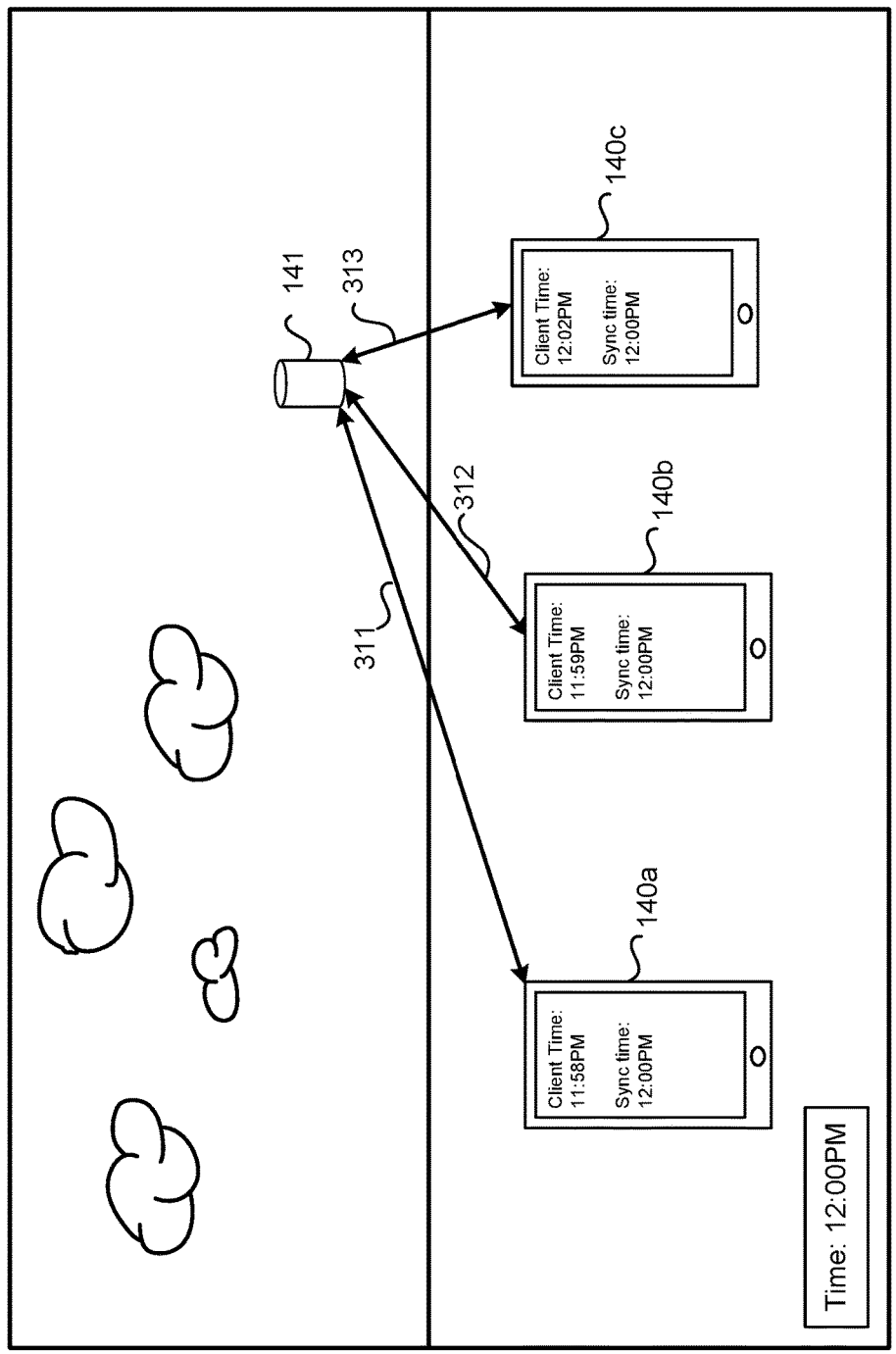
FIG. 4 illustrates a host device communicating information with individual client devices in a real-world environment, in accordance with one or more implementations.

FIG. 4 illustrates host device 141 communicating information with client device(s) 140 in a real-world environment. The group performance content provided by the individual client devices may be based on the real-world location of the individual client devices.

Figure 5:
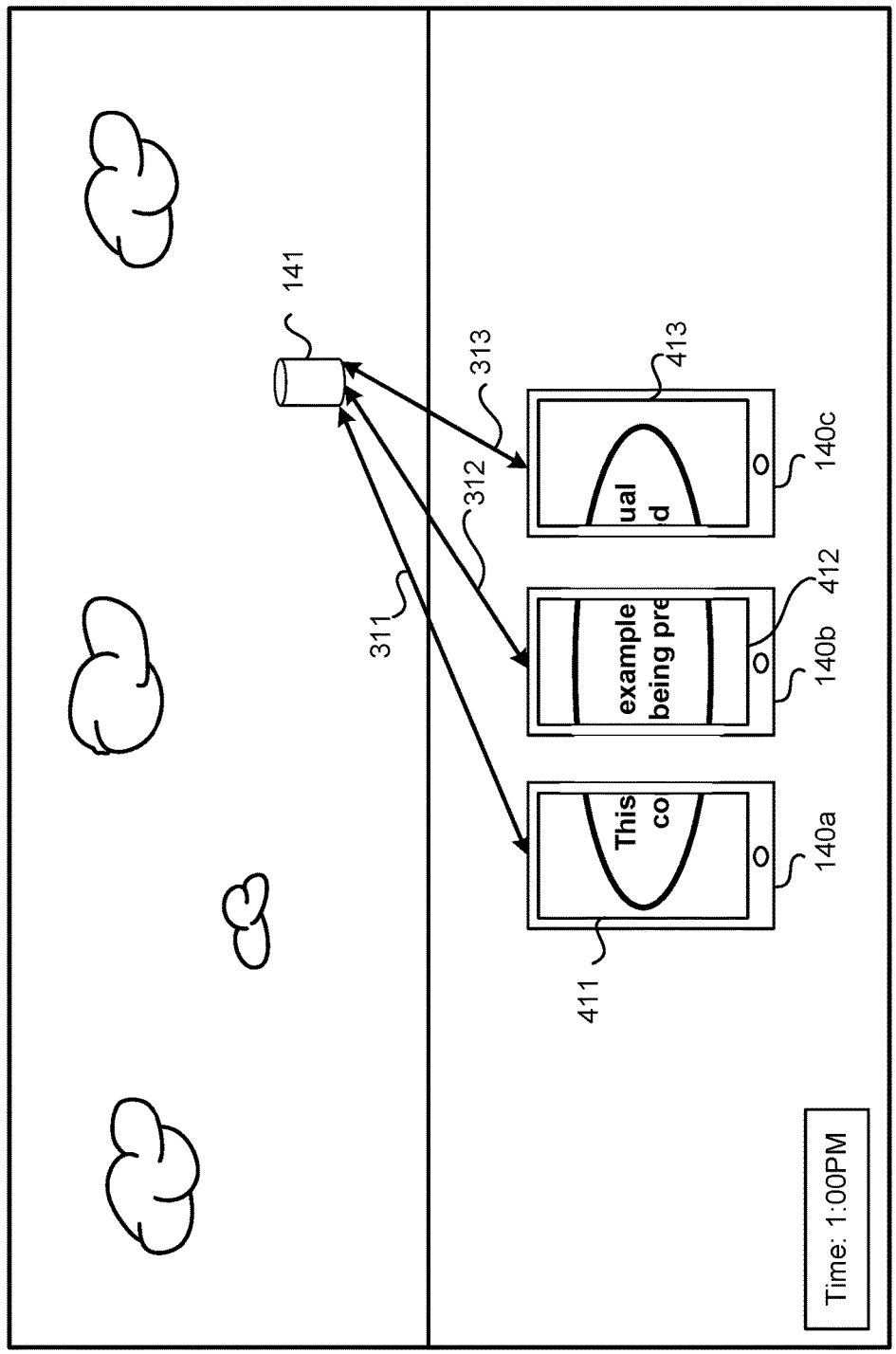
FIG. 5 illustrates the individual client devices providing visual content of the group performance content in a synchronized manner, in accordance with one or more implementations.

FIG. 5 illustrates the individual client devices providing the group performance content in a synchronized manner. The group performance content may be visual content of a message. The message may be "This is an example of visual content being presented." The individual client devices may begin providing the group performance content based on the time indicated by the time information. The portion of the group performance content provided by the individual client devices may depend on the real-world location of the individual client devices. First client device 140*a* at a first location may provide a visual content 411 of the first portion of group performance content. Second client device 140*b* at a second location may provide a visual content 412 of the second portion of group performance content. Third client device 140*c* at a third location may a visual content 413 of the third portion of group performance content. The aggregate of the individual portions of the visual content of the group performance content provided by the individual client devices may create the group performance.

Figure 6:
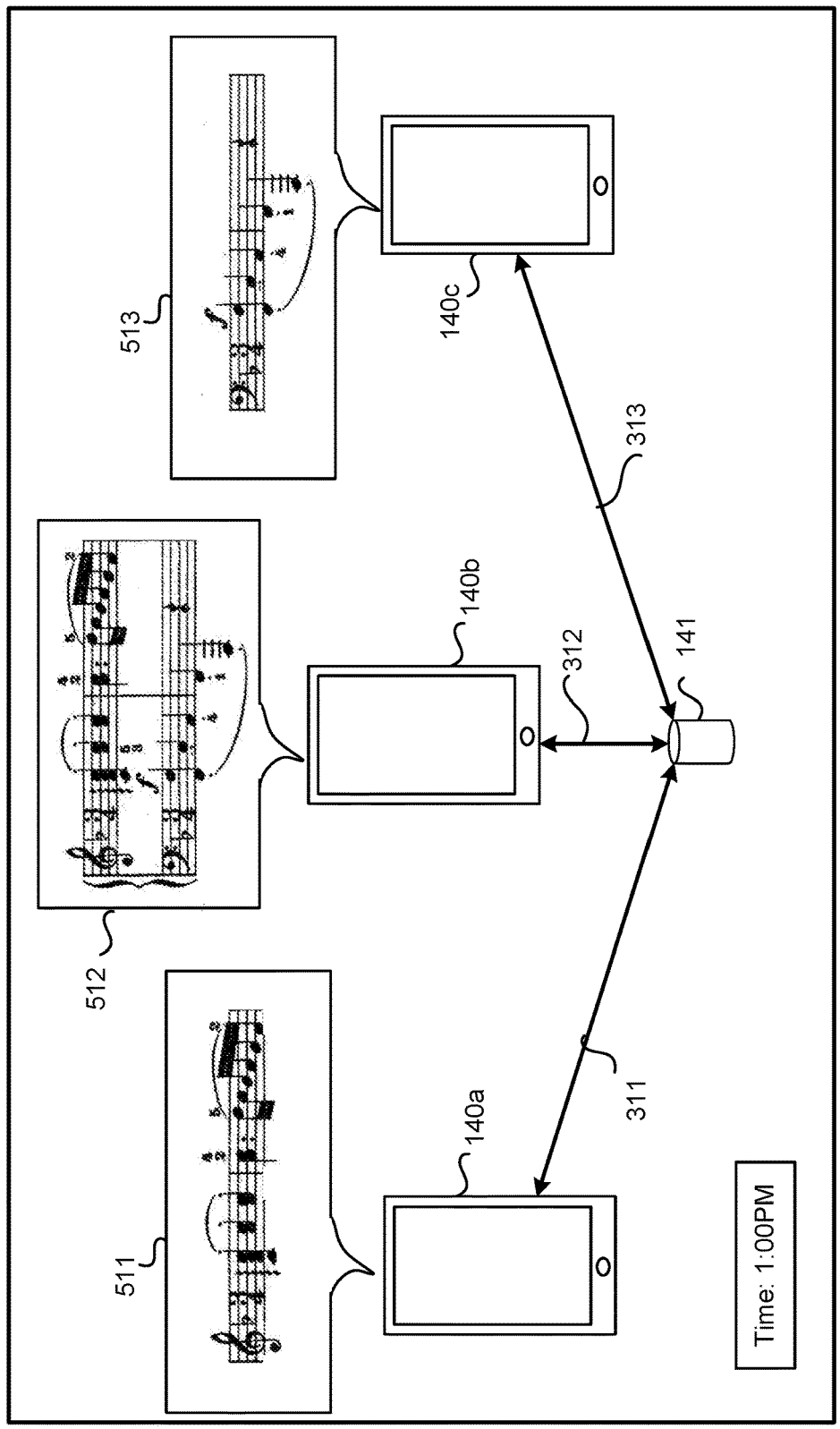
FIG. 6 illustrates the individual client devices providing audio content of the group performance content in a synchronized manner, in accordance with one or more implementations.

FIG. 6 illustrates the individual client devices providing the group performance content in a synchronized manner. The group performance content may be audio content of a sound clip. The sound clip may be music with one or more parts. The individual client devices may begin providing the group performance content based on the time indicated by the time information. The portion of the group performance content provided by the individual client devices may depend on the real-world location of the individual client devices. First client device 140*a* at the first location may provide an audio content 511 of the first portion of group performance content. Second client device 140*b* at the second location may provide an audio content 512 of the second portion of group performance content. Third client device 140*c* at the third location may an audio content 513 of the third portion of group performance content. The aggregate of the individual portions of the audio content of the group performance content provided by the individual client devices may create the group performance. For example, audio content 511 and audio content 513 presented by the first client device 140*a* and third client device 140*c* respectively in a synchronized manner may result in the audio content 512. Audio content 511 and audio content 513 may be audio from individual staffs of the system (e.g., music sheet) of the audio content (such as music). Audio content 511 and audio content 513 played in a synchronized manner may result in the audio content. Audio content 511 and audio content 513 played in a synchronized manner may result in audio content 512. Audio content 512 may be the aggregate of the individual portions of the audio content of the group performance content provided. Second client device 140*b* at the second location may provide audio content 512. The aggregate of the individual portions of the audio content of the group performance content provided may result in the group performance.

Host device 141 may provide the individual client devices with information defining the actual progress of the group performance content that should be presented at a given point in time. The actual progress of the group performance content that should be presented at the given point in time may be defined by the time information. The individual client devices may determine a synchronized local offset time and time adjustment based on the actual progress of the group performance content that should be presented at the given point in time. The individual client devices may adjust the group performance content provided based on the synchronized local offset time and time adjustment such that the group performance content provided are synchronized with one another. In some implementations, the individual client devices may set the group performance content provided to match the actual progress of the group performance content that should be presented at the given point in time such that the group performance content provided are synchronized with one another.

Figure 2:
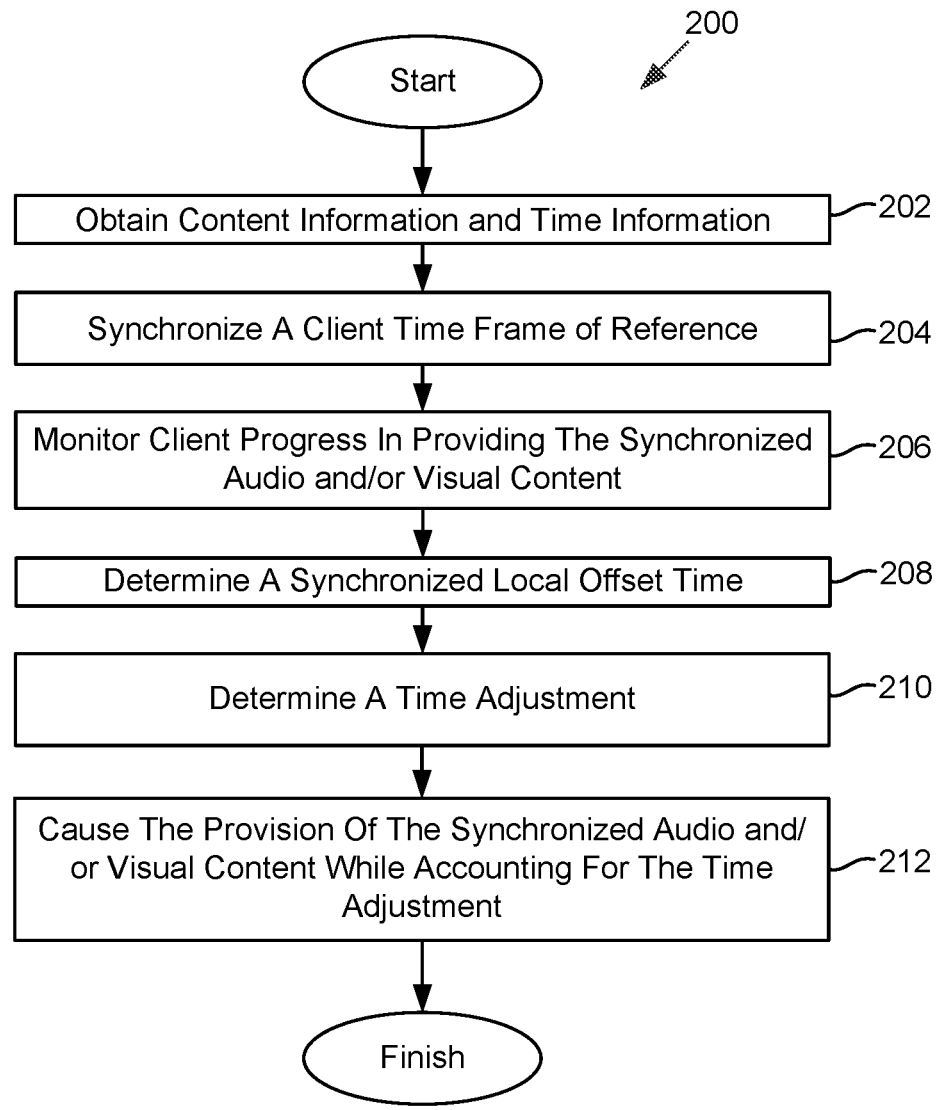
FIG. 2 illustrates a method for providing a group performance using a set of client devices, in accordance with one or more implementations.

FIG. 2 illustrates a method 200 for providing a group performance using a set of client devices. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below are not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a first client device in a set of client devices may obtain communication of content information and time information from a host device. The first client device may be provided with the content information and time information from the host device. The content information may define audio and/or visual content of the first client device's portion of a group performance. The time information may indicate one or more points in time for the first client device to provide the audio and/or visual content. The one or more points in time may be specified with respect to a host time frame of reference of the host device. The time information may include a host time frame of reference for client time frame of references the set of client devices to synchronize with. In some embodiments, operation 202 is performed by a content component the same as or similar to content component 106 (shown in FIG. 1 and described herein).

At an operation 204, a client time frame of reference of the first client device may be synchronized with the host time frame of reference. Synchronizing the client time frame of reference of the first client device with the host time frame of reference may cause the client time frame of reference of the first client device to be the same as the other client time frame of reference of the other client devices. The synchronized client time frame of reference of the first client device may facilitate production of synchronized audio and/or visual content by the first client device. The production of the synchronized audio and/or visual content may include the production of the audio and/or visual content synchronized with the one or more points in time specified with respect to the host time frame of reference. In some embodiments, operation 204 is performed by a synchronization component the same as or similar to synchronization component 108 (shown in FIG. 1 and described herein)

At an operation 206, client progress of the first client device in providing the synchronized audio and/or visual content may be monitored. The client progress may be monitored to ensure that the audio and/or visual content provided may be synchronized and/or presented at the one or more points in time indicated by the time information. An adjustment to the audio and/or visual content provided may be made based on the monitored information. In some embodiments, operation 206 is performed by a monitor component the same as or similar to monitor component 110 (shown in FIG. 1 and described herein)

At an operation 208, a synchronized local offset time may be determined based on the client progress. The synchronized local offset time may indicate a difference between actual one or more points in time the first client device may be providing the synchronized audio and/or visual content and the one or more points in time. The synchronized local offset time may be used to determine an adjust the audio and/or visual content provided such that the audio and/or visual content provided may be synchronized and/or presented at the one or more points in time indicated by the time information. In some embodiments, operation 208 is performed by a determination component the same as or similar to determination component 112 (shown in FIG. 1 and described herein).

At an operation 210, a time adjustment to the provision of the synchronized audio and/or visual content provided by the first client device may be determined. The time adjustment may be determined based on the synchronized local offset time. The time adjustment may be used to adjust the audio and/or visual content provided such that the audio and/or visual content provided may be synchronized and/or presented at the one or more points in time indicated by the time information. In some embodiments, operation 210 is performed by the determination component the same as or similar to determination component 112 (shown in FIG. 1 and described herein).

At an operation 212, the first client device may be caused to provide the synchronized audio and/or visual content while accounting for the time adjustment. In some embodiments, operation 212 is performed by a presentation component the same as or similar to presentation component 114 (shown in FIG. 1 and described herein).

Although the system(s) and/or method(s) of this disclosure have been described in detail for the purpose of illustration based on what is currently considered to be the most practical and/or preferred implementations, it is to be understood that such detail is solely for that purpose and/or that the disclosure is not limited to the disclosed implementations, but, on the contrary, is intended to cover modifications and/or equivalent arrangements that are within the spirit and/or scope of the appended claims. For example, it is to be understood that the present disclosure contemplates that, to the extent possible, one or more features of any implementation can be combined with one or more features of any other implementation.

What is claimed:

1. A system configured to provide a group performance using a set of client devices, the system comprising:
one or more physical processors configured by machine-readable instructions to:
obtain, at a first client device in a set of client devices, communication of content information and time information from a host device, the content information defining audio and/or visual content of the first client device's portion of a group performance, the time information indicating one or more points in time for the first client device to provide the audio and/or visual content, the one or more points in time being specified with respect to a host time frame of reference of the host device;
synchronize a client time frame of reference of the first client device with the host time frame of reference to facilitate production of synchronized audio and/or visual content by the first client device, the production of the synchronized audio and/or visual content including production of the audio and/or visual content synchronized with the one or more points in time specified with respect to the host time frame of reference;
monitor client progress of the first client device in providing the synchronized audio and/or visual content;
determine a synchronized local offset time based on the client progress indicating a difference between actual one or more points in time the first client device is providing the synchronized audio and/or visual content and the one or more points in time;
determine a time adjustment to the provision of the synchronized audio and/or visual content provided by the first client device based on the synchronized local offset time; and
cause the first client device to provide the synchronized audio and/or visual content while accounting for the time adjustment.

2. The system of claim 1, wherein audio and/or visual content for a different portion of the group performance is provided by a second client device in the set of client devices.

3. The system of claim 1, wherein audio and/or visual content provided by individual client devices of the set of client devices depends on the real-world location of the individual client devices.

4. The system of claim 1, wherein the audio content includes music and/or utterances, and the visual content includes images and/or video.

5. The system of claim 1, wherein the monitoring of the client progress occurs throughout a duration of the provision of the synchronized audio and/or visual content.

6. The system of claim 1, wherein the audio content and visual content are presented contemporaneously in time or at different times.

7. The system of claim 1, wherein the first client device includes the one or more physical processors.

8. The system of claim 1, wherein the one or more physical processors are further configured by the machine-readable instructions to:
obtain criteria associated with the provision of the synchronized audio and/or visual content;
obtain parameter values of parameters of the first client device;
determine whether the criteria is satisfied based on the parameter values;
responsive to the satisfaction of the criteria based on the parameter values, enable the provision of the synchronized audio and/or visual content by the first client device; and
responsive to non-satisfaction of the criteria based on the parameter values, disable the provision of the synchronized audio and/or visual content by the first client device.

9. The system of claim 8, wherein the criteria include one or more of having a particular operating system model, having a network connection with the host device, having available memory, having available processing power, enabling one or more speakers associated with the individual client devices, enabling one or more displays associated with the individual client devices, being in a geolocation, or being in proximity to a geolocation.

10. The system of claim 1, wherein the client time frame of reference of the first client device is synchronized with the host time frame of reference by determining a client-host offset time for the first client device, the client-host offset time for the first client device representing a relative time difference between the client time frame of reference and the host time frame of reference, wherein the first client device adjusts presentation of the audio and/or visual content based on the client-host offset times so that the audio and/or visual content is provided at the one or more points in time to account for the relative time difference.

11. A method for providing a group performance using a set of client devices, the method comprising:
obtaining, at a first client device in a set of client devices, communication of content information and time information from a host device, the content information defining audio and/or visual content of the first client device's portion of a group performance, the time information indicating one or more points in time for the first client device to provide the audio and/or visual content, the one or more points in time being specified with respect to a host time frame of reference of the host device;
synchronizing a client time frame of reference of the first client device with the host time frame of reference to facilitate production of synchronized audio and/or visual content by the first client device, the production of the synchronized audio and/or visual content including production of the audio and/or visual content synchronized with the one or more points in time specified with respect to the host time frame of reference;
monitoring client progress of the first client device in providing the synchronized audio and/or visual content;
determining a synchronized local offset time based on the client progress indicating a difference between actual one or more points in time the first client device is providing the synchronized audio and/or visual content and the one or more points in time;
determining a time adjustment to the provision of the synchronized audio and/or visual content provided by the first client device based on the synchronized local offset time; and
causing the first client device to provide the synchronized audio and/or visual content while accounting for the time adjustment.

12. The method of claim 11, wherein audio and/or visual content for a different portion of the group performance is provided by a second client device in the set of client devices.

13. The method of claim 11, wherein audio and/or visual content provided by individual client devices of the set of client devices depends on the real-world location of the individual client devices.

14. The method of claim 11, wherein the audio content includes music and/or utterances, and the visual content includes images and/or video.

15. The method of claim 11, wherein the monitoring of the client progress occurs throughout a duration of the provision of the synchronized audio and/or visual content.

16. The method of claim 11, wherein the audio content and visual content are presented contemporaneously in time or at different times.

17. The method of claim 11, wherein the first client device includes the one or more physical processors.

18. The system of claim 11, wherein the method further comprises of:
    obtaining criteria associated with the provision of the synchronized audio and/or visual content;
    obtaining parameter values of parameters of the first client device;
    determining whether the criteria is satisfied based on the parameter values;
        responsive to the satisfaction of the criteria based on the parameter values, enabling the provision of the synchronized audio and/or visual content by the first client device; and
        responsive to non-satisfaction of the criteria based on the parameter values, disabling the provision of the synchronized audio and/or visual content by the first client device.

19. The method of claim 18, wherein the criteria include one or more of having a particular operating system model, having a network connection with the host device, having available memory, having available processing power, enabling one or more speakers associated with the individual client devices, enabling one or more displays associated with the individual client devices, being in a geolocation, or being in proximity to a geolocation.

20. The method of claim 11, wherein the client time frame of reference of the first client device is synchronized with the host time frame of reference by determining a client-host offset time for the first client device, the client-host offset time for the first client device representing a relative time difference between the client time frame of reference and the host time frame of reference, wherein the first client device adjusts presentation of the audio and/or visual content based on the client-host offset times so that the audio and/or visual content is provided at the one or more points in time to account for the relative time difference.

* * * * *